United States Patent
Zhang et al.

(10) Patent No.: US 11,864,121 B2
(45) Date of Patent: Jan. 2, 2024

(54) TRANSMIT POWER DETERMINING METHOD, PROCESSING CHIP, AND COMMUNICATIONS DEVICE

(71) Applicant: HUAWEI TECHNOLOGIES CO., LTD., Shenzhen (CN)

(72) Inventors: Xi Zhang, Ottawa (CA); Peng Guan, Shenzhen (CN); Xiaoyong Tang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/473,496

(22) Filed: Sep. 13, 2021

(65) Prior Publication Data
US 2021/0410073 A1 Dec. 30, 2021

Related U.S. Application Data

(63) Continuation of application No. 16/855,686, filed on Apr. 22, 2020, now Pat. No. 11,122,514, which is a
(Continued)

(30) Foreign Application Priority Data

Jun. 16, 2017 (CN) .......................... 201710459810.7
Aug. 15, 2017 (CN) .......................... 201710698502.X

(51) Int. Cl.
*H04W 52/14* (2009.01)
*H04W 52/32* (2009.01)
(Continued)

(52) U.S. Cl.
CPC ............. *H04W 52/14* (2013.01); *H04L 5/006* (2013.01); *H04L 5/0044* (2013.01);
(Continued)

(58) Field of Classification Search
CPC ..... H04W 52/14; H04W 52/16; H04W 52/18; H04W 52/143; H04W 52/146;
(Continued)

(56) References Cited

U.S. PATENT DOCUMENTS

2009/0181714 A1 7/2009 Yajima et al.
2010/0254471 A1 10/2010 Ko et al.
(Continued)

FOREIGN PATENT DOCUMENTS

CN 101489297 A 7/2009
CN 102742191 A 10/2012
(Continued)

OTHER PUBLICATIONS

Cisco et al.,"TS V5G.211 V1.7 (Oct. 2016)—Verizon 5G TF; Air Interface Working Group; Verizon 5th Generation Radio Access; Physical channels and modulation (Release 1)",Verizon, total 83 pages.
(Continued)

*Primary Examiner* — Raymond S Dean
(74) *Attorney, Agent, or Firm* — Leydig, Voit & Mayer, Ltd.

(57) ABSTRACT

A communication method is provided, including: determining, by a first device, a relative power ratio between a phase tracking reference signal (PTRS) and a data channel; determining, by the first device, a transmit power of the PTRS based on the relative power ratio of the PTRS to the data channel; and sending, by the first device, the PTRS to a second device by using the transmit power of the PTRS.

20 Claims, 9 Drawing Sheets

Related U.S. Application Data continuation of application No. 16/204,879, filed on Nov. 29, 2018, now Pat. No. 10,652,829, which is a continuation of application No. PCT/CN2018/091226, filed on Jun. 14, 2018.

(51) Int. Cl.
*H04W 52/16* (2009.01)
*H04L 5/00* (2006.01)
*H04W 52/18* (2009.01)

(52) U.S. Cl.
CPC ......... *H04L 5/0048* (2013.01); *H04W 52/143* (2013.01); *H04W 52/146* (2013.01); *H04W 52/16* (2013.01); *H04W 52/18* (2013.01); *H04W 52/325* (2013.01)

(58) Field of Classification Search
CPC .... H04W 52/325; H04L 5/006; H04L 5/0044; H04L 5/0048
See application file for complete search history.

(56) References Cited

U.S. PATENT DOCUMENTS

| | | | |
|---|---|---|---|
| 2012/0121031 A1* | 5/2012 | Tang ................... | H04B 7/046 375/267 |
| 2012/0213186 A1 | 8/2012 | Ng et al. | |
| 2014/0016622 A1 | 1/2014 | Bao et al. | |
| 2014/0112194 A1 | 4/2014 | Novlan et al. | |
| 2014/0313994 A1 | 10/2014 | Su et al. | |
| 2015/0327095 A1 | 11/2015 | Kwak et al. | |
| 2016/0295520 A1 | 10/2016 | Dinan | |
| 2018/0014254 A1 | 1/2018 | Hwang et al. | |
| 2018/0132122 A1* | 5/2018 | Yoo ..................... | H04W 24/08 |
| 2018/0323933 A1* | 11/2018 | Nam .................... | H04W 72/12 |
| 2018/0351719 A1 | 12/2018 | Lee et al. | |
| 2019/0199487 A1 | 6/2019 | Ko et al. | |
| 2019/0306808 A1 | 10/2019 | Gao et al. | |

FOREIGN PATENT DOCUMENTS

| | | |
|---|---|---|
| CN | 103298088 A | 9/2013 |
| CN | 103533628 A | 1/2014 |
| CN | 104349491 A | 2/2015 |
| CN | 104813713 A | 7/2015 |
| CN | 105827383 A | 8/2016 |
| CN | 106664664 A | 5/2017 |
| CN | 108633037 A | 10/2018 |
| WO | 2010146867 A1 | 12/2010 |

OTHER PUBLICATIONS

Cisco et al.,"TS V5G.212 V1.5 (Sep. 2016)—Verizon 5G TF; Air Interface Working Group; Verizon 5th Generation Radio Access; Multiplexing and channel coding (Release 1)",Verizon, total 62 pages.

Cisco et al.,"TS V5G.213 v1.4 (Oct. 2016)—Verizon 5G TF; Air Interface Working Group; Verizon 5th Generation Radio Access; Physical layer procedures (Release 1)",Verizon,total 50 pages.

Ericsson, R1-1707802, "Summary of PTRS open issues", 3GPP TSG-RAN WG1 Meeting #89, Hangzhou, China, 4 pages. May 15th-19th.

3GPP TS 36.211 V12.4.0 (Dec. 2014), 3rd Generation Partnership Project; Technical Specification Group Radio Access Network; Evolved Universal Terrestrial Radio Access (E-UTRA); Physical channels and modulation (Release 12), 124 pages.

3GPP TS 36.212 V13.0.0 (Dec. 2015), 3rd Generation Partnership Projectjechnical Specification Group Radio Access Network; Evolved Universal Terrestrial Radio Access (E-UTRA); Multiplexing and channel coding (Release 13), 121 pages.

3GPP TS 36.213 V13.0.0 (Dec. 2015), 3rd Generation Partnership Projectjechnical Specification Group Radio Access Network; Evolved Universal Terrestrial Radio Access (E-UTRA); Physical layer procedures (Release 13), 326 pages.

3GPP TS 38.211 V0.0.0 (May 2017), 3rd Generation Partnership Project;Technical Specification Group Radio Access Network; NR; Physical channels and modulation (Release 15), total 10 pages.

"On UL PT-RS design," 3GPP TSG RAN WG1 Meeting #89, Hangzhou, P.R. China, R1-1707617, XP51272825, pp. 1-8, 3rd Generation Partnership Project, Valbonne, France (May 15-19, 2017).

"Discussion on PT-RS for DL," 3GPP TSG RAN WG1 Meeting #88, Athens, Greece, R1-1702297, XP51209451, pp. 1-3, 3rd Generation Partnership Project, Valbonne, France (Feb. 13-17, 2017).

"3rd Generation Partnership Project; Technical Specification Group Radio Access Network; NR; Multiplexing and channel coding (Release 15)," 3GPP TS 38.212 V0.0.0, pp. 1-10, 3rd Generation Partnership Project, Valbonne, France (May 2017).

"3rd Generation Partnership Project; Technical Specification Group Radio Access Network; NR; NR and NG-RAN Overall Description; Stage 2 (Release 15)," 3GPP TS 38.300 V0.4.1, pp. 1-55, 3rd Generation Partnership Project, Valbonne, France (Jun. 2017).

"3rd Generation Partnership Project; Technical Specification Group Radio Access Network; NR; Radio Resource Control (RRC); Protocol specification (Release 15)," 3GPP TS 38.331 V0.0.3, pp. 1-20, 3rd Generation Partnership Project, Valbonne, France (May 2017).

* cited by examiner (1) Transport layer 1

(2) Transport layer 2

(1) Transport layer 1

TRANSMIT POWER DETERMINING METHOD, PROCESSING CHIP, AND COMMUNICATIONS DEVICE

CROSS-REFERENCE TO RELATED APPLICATIONS

This application is a continuation of U.S. patent application Ser. No. 16/855,686, filed on Apr. 22, 2020, which is a continuation of U.S. patent application Ser. No. 16/204,879, filed on Nov. 29, 2018, now U.S. Pat. No. 10,652,829. which claims a continuation of International Application No. PCT/CN2018/091226, filed on Jun. 14, 2018, which claims priority to Chinese Patent Application No. 201710459810.7, filed on Jun. 16, 2017 and Chinese Patent Application No. 201710698502.X, filed on Aug. 15, 2017. All of the aforementioned patent applications are hereby incorporated by reference in their entireties.

TECHNICAL FIELD

Embodiments of the present disclosure relate to the field of communications technologies, and in particular, to a transmit power determining method, a processing chip, and a communications device.

BACKGROUND

In comparison with Long Term Evolution (LTE), a higher carrier frequency is used in a 5G communications system. A current standard stipulates that a high frequency is usually above 6 GHz, and a currently most researched band is 28 GHz, 38 GHz, 72 GHz, or the like, to implement wireless communication with higher bandwidth and a higher transmission rate. However, in comparison with conventional low-frequency communication, a high frequency system has more serious intermediate radio frequency distortion, especially impact of phase noise. In addition, impact of a Doppler shift and a carrier frequency offset (CFO) increases with a frequency.

In an example of multiple-input multiple-output orthogonal frequency division multiplexing (MIMO-OFDM), both phase noise and a carrier frequency offset of a receive end and those of a transmit end are considered, and a reception expression of an $n^{th}$ receive antenna on a $k^{th}$ subcarrier after the receive end performs fast Fourier transform (FFT) is:

$$Y_n^k = \sum_{m=1}^{M} H_{nm}^k \underbrace{P_n^{r,G} P_m^{t,0} S_m^k}_{CPE} + \underbrace{\sum_{m=1}^{M}\sum_{t=0}^{K-1} P_n^{r,(k-1)K} H_{nm}^i \sum_{i=0, i+1 \& i \neq k}^{K-1} P^{t,(i-1)} S_m^l + Z_n^k;}_{ICI}$$

where $$P_n^{r,k} = \frac{1}{K}\sum_{t=0}^{K-1} e^{j\theta_n^r(t)} e^{j2\pi tk/K},$$

$$P_m^{t,k} = \frac{1}{K}\sum_{t=0}^{K-1} e^{j\theta_m^t(t)} e^{j2\pi tk/K},$$

namely:

$$P_n^{r,0} = \frac{1}{K}\sum_{t=0}^{K-1} e^{j\theta_n^r(t)},$$

$$P_m^{t,0} = \frac{1}{K}\sum_{t=0}^{K-1} e^{j\theta_m^t(t)}.$$

$H_{nm}^k$ represents a channel from an $m^{th}$ transmit antenna to the $n^{th}$ receive antenna on the $k^{th}$ subcarrier, $S_m^k$ represents data sent by using the $m^{th}$ transmit antenna on the $k^{th}$ subcarrier, $Z_n^k$ represents noise of the $n^{th}$ receive antenna on the $k^{th}$ subcarrier, $P_n^{r,k}$ represents a phase deviation caused by the phase noise and the CFO of the receive end for the $n^{th}$ receive antenna on the $k^{th}$ subcarrier, and $P_m^{t,k}$ represents a phase deviation caused by the phase noise and the CFO of the transmit end for an $m^{th}$ transmit antenna on the $k^{th}$ subcarrier. It can be learned from the expression that impact of phase noise on OFDM performance is mainly reflected in two aspects: a common phase error (CPE) and inter-carrier interference (ICI), and impact of CFO on OFDM performance is mainly reflected in ICI. In an actual system, the impact of the ICI on the performance is less than the impact of the CPE on the performance. Therefore, the CPE is preferentially compensated for in a phase noise compensation scheme.

FIG. 1A shows a constellation point at which a 64QAM modulation signal is not affected by phase noise. FIG. 1B shows a constellation point at which a 64 quadrature amplitude modulation (QAM) signal on a 2G band is affected by phase noise. FIG. 1C shows a constellation point at which a 64 QAM modulation signal on a 28G band is affected by phase noise. As shown in FIG. 1A to FIG. 1C, phase noise is used as an example, and a phase noise level deteriorates with a band at a level of $20\times\log^{(f1/f2)}$. A 2G band and a 28G band are used as an example, and a phase noise level of the 28G band is higher than that of the 2G band by 23 dB. A higher phase noise level causes greater impact of a common phase error, and the CPE causes a bigger phase error.

A CPE imposes same impact on different subcarriers of a same OFDM symbol, and phase errors on the different subcarriers are different because of white Gaussian noise. Therefore, in frequency domain, a specific quantity of phase compensation reference signals (PCRS) needs to be used to estimate the CPE and calculate an average, to reduce impact of the white Gaussian noise as much as possible. PCRS may also be referred to as phase tracking reference signals (PTRS). PCRS is not uniformly named currently in the industry, but is uniformly referred to as the PTRS subsequently for convenience in the present disclosure.

Currently, how to determine transmit power of a PTRS is a technical problem that needs to be urgently resolved.

SUMMARY

Embodiments of this application provide a transmit power determining method, so as to flexibly adapt to different quantities of demodulation reference signal (DMRS) ports, different quantities of PTRS ports, or different port multiplexing manner configurations, thereby ensuring efficient energy use, and improving PTRS measurement accuracy.

According to a first aspect, an embodiment of this application provides a transmit power determining method, including: determining, by a first device, a relative power ratio of a phase tracking reference signal PTRS to a data channel or a relative power ratio of a PTRS to a demodulation reference signal DMRS, where the relative power ratio of the PTRS to the data channel is determined by using a first function and a first variable, the relative power ratio of the PTRS to the DMRS is determined by using a second function, the first variable, and a second variable, the first variable includes a quantity of transport layers or a quantity of DMRS ports, and the second variable includes a frequency domain density of the DMRS; determining, by the first device, transmit power of the PTRS based on the relative power ratio of the PTRS to the data channel and transmit power of the data channel or based on the relative power ratio of the PTRS to the DMRS and transmit power of the DMRS; and sending, by the first device, the PTRS to a second device by using the transmit power of the PTRS.

According to the first aspect, in a possible implementation, the first device includes a terminal device, the second device includes a base station device, and the data channel includes a physical uplink shared channel (PUSCH).

According to the first aspect, in a possible implementation, the first device includes a base station device, the second device includes a terminal device, and the data channel includes a physical downlink shared channel (PDSCH).

According to the first aspect and all the possible implementations of the first aspect, in a possible implementation, that the relative power ratio of the PTRS to the data channel is determined by using a first function and a first variable includes:

relative power ratio of the PTRS to the data channel=$10 \log_{10}(X)$, where

X includes the first variable.

According to the first aspect and all the possible implementations of the first aspect, in a possible implementation, that the relative power ratio of the PTRS to the DMRS is determined by using a second function, the first variable, and a second variable includes:

relative power ratio of the PTRS to the DMRS=$10 \log_{10}(XY)$, where

X includes the first variable, and Y includes the second variable.

According to a second aspect, an embodiment of this application provides a transmit power determining method, including: searching, by a first device, a table to determine a relative power ratio of a phase tracking reference signal (PTRS) to a data channel or a relative power ratio of a PTRS to a demodulation reference signal (DMRS); determining, by the first device, transmit power of the PTRS based on the relative power ratio of the PTRS to the data channel and transmit power of the data channel or based on the relative power ratio of the PTRS to the DMRS and transmit power of the DMRS; and sending, by the first device, the PTRS to a second device by using the transmit power of the PTRS.

According to the second aspect, in a possible implementation, the first device includes a terminal device, the second device includes a base station device, and the data channel includes a physical uplink shared channel (PUSCH).

According to the second aspect, in a possible implementation, the first device includes a base station device, the second device includes a terminal device, and the data channel includes a physical downlink shared channel (PDSCH).

According to the second aspect and all the possible implementations of the second aspect, in a possible implementation, the searching, by a first device, a table to determine a relative power ratio of a PTRS to a data channel includes:

searching, by the first device, the following table to determine the relative power ratio of the PTRS to the data channel:

| Quantity of transport layers | Relative power ratio (dB) of the PTRS to the PUSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 | or

| Quantity of DMRS ports | Relative power ratio (dB) of the PTRS to the PUSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 |

According to the second aspect and all the possible implementations of the second aspect, in a possible implementation, the searching, by a first device, a table to determine a relative power ratio of a PTRS to a data channel includes:

searching, by the first device, the following table to determine the relative power ratio of the PTRS to the data channel:

| Quantity of transport layers | Relative power ratio (dB) of the PTRS to the PDSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 | or

| Quantity of DMRS ports | Relative power ratio (dB) of the PTRS to the PDSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 |

According to the second aspect and all the possible implementations of the second aspect, in a possible implementation, the searching, by a first device, a table to determine a relative power ratio of a PTRS to a DMRS includes:

searching, by the first device, the following table to determine the relative power ratio of the PTRC to the DMRS:

| Quantity of transport layers | Frequency domain density of the DMRS | Relative power ratio (dB) of the PTRS to the DMRS |
|---|---|---|
| 1 | 1/4 | (−)6 |
| 2 | 1/4 | (−)3 |
| 3 | 1/4 | (−)1.23 |
| 4 | 1/4 | 0 |
| 5 | 1/4 | 0 |
| 6 | 1/4 | 0 |
| 7 | 1/4 | 0 |
| 8 | 1/4 | 3 | or

| Quantity of DMRS ports | Frequency domain density of the DMRS | Relative power ratio (dB) of the PTRS to the DMRS |
|---|---|---|
| 1 | 1/4 | (−)6 |
| 2 | 1/4 | (−)3 |
| 3 | 1/4 | (−)1.23 |
| 4 | 1/4 | 0 |
| 5 | 1/4 | 0 |
| 6 | 1/4 | 0 |
| 7 | 1/4 | 0 |
| 8 | 1/4 | 3 |

According to a third aspect, an embodiment of this application provides a processing chip, configured to: determine a relative power ratio of a phase tracking reference signal (PTRS) to a data channel or a relative power ratio of a PTRS to a demodulation reference signal (DMRS), where the relative power ratio of the PTRS to the data channel is determined by using a first function and a first variable, the relative power ratio of the PTRS to the DMRS is determined by using a second function, the first variable, and a second variable, the first variable includes a quantity of transport layers or a quantity of DMRS ports, and the second variable includes a frequency domain density of the DMRS; and determine transmit power of the PTRS based on the relative power ratio of the PTRS to the data channel and transmit power of the data channel or based on the relative power ratio of the PTRS to the DMRS and transmit power of the DMRS.

According to the third aspect, in a possible implementation, the data channel includes a physical uplink shared channel (PUSCH) or a physical downlink shared channel (PDSCH).

According to the third aspect and all the possible implementations of the third aspect, in a possible implementation, that the relative power ratio of the PTRS to the data channel is determined by using a first function and a first variable includes:

relative power ratio of the PTRS to the data channel=10 $\log_{10}(X)$, where

X includes the first variable.

According to the third aspect and all the possible implementations of the third aspect, in a possible implementation, that the relative power ratio of the PTRS to the DMRS is determined by using a second function, the first variable, and a second variable includes:

relative power ratio of the PTRS to the DMRS=10 $\log_{10}(XY)$, where

X includes the first variable, and Y includes the second variable.

According to a fourth aspect, an embodiment of this application provides a processing chip, configured to: search a table to determine a relative power ratio of a phase tracking reference signal (PTRS) to a data channel or a relative power ratio of a PTRS to a demodulation reference signal (DMRS); and determine transmit power of the PTRS based on the relative power ratio of the PTRS to the data channel and transmit power of the data channel or based on the relative power ratio of the PTRS to the DMRS and transmit power of the DMRS.

According to the fourth aspect, in a possible implementation, the data channel includes a physical uplink shared channel (PUSCH).

According to the fourth aspect and all the possible implementations of the fourth aspect, in a possible implementation, the data channel includes a physical downlink shared channel (PDSCH).

According to the fourth aspect and all the possible implementations of the fourth aspect, in a possible implementation, the searching a table to determine a relative power ratio of a PTRS to a data channel includes:

searching the following table to determine the relative power ratio of the PTRS to the data channel:

| Quantity of transport layers | Relative power ratio (dB) of the PTRS to the PUSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 | or

| Quantity of DMRS ports | Relative power ratio (dB) of the PTRS to the PUSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 |

According to the fourth aspect and all the possible implementations of the fourth aspect, in a possible implementation, the searching a table to determine a relative power ratio of a PTRS to a data channel includes:

searching the following table to determine the relative power ratio of the PTRS to the data channel:

| Quantity of transport layers | Relative power ratio (dB) of the PTRS to the PDSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 | or

| Quantity of DMRS ports | Relative power ratio (dB) of the PTRS to the PDSCH |
|---|---|
| 1 | 0 |
| 2 | 3 |
| 3 | 4.77 |
| 4 | 6 |
| 5 | 7 |
| 6 | 7.78 |
| 7 | 8.45 |
| 8 | 9 |

According to the fourth aspect and all the possible implementations of the fourth aspect, in a possible implementation, the searching a table to determine a relative power ratio of a PTRS to a DMRS includes:

searching the following table to determine the relative power ratio of the PTRS to the DMRS:

| Quantity of transport layers | Frequency domain density of the DMRS | Relative power ratio (dB) of the PTRS to the DMRS |
|---|---|---|
| 1 | 1/4 | (−)6 |
| 2 | 1/4 | (−)3 |
| 3 | 1/4 | (−)1.23 |
| 4 | 1/4 | 0 |
| 5 | 1/4 | 0 |
| 6 | 1/4 | 0 |
| 7 | 1/4 | 0 |
| 8 | 1/4 | 3 | or

| Quantity of DMRS ports | Frequency domain density of the DMRS | Relative power ratio (dB) of the PTRS to the DMRS |
|---|---|---|
| 1 | 1/4 | (−)6 |
| 2 | 1/4 | (−)3 |
| 3 | 1/4 | (−)1.23 |
| 4 | 1/4 | 0 |
| 5 | 1/4 | 0 |
| 6 | 1/4 | 0 |
| 7 | 1/4 | 0 |
| 8 | 1/4 | 3 |

According to a fifth aspect, this application provides a communications device, including a processor and a transmitter. The communications device is configured to perform the method provided in the first aspect and all the possible implementations of the first aspect.

According to a sixth aspect, this application provides a communications device, including a processor and a transmitter. The communications device is configured to perform the method provided in the second aspect and all the possible implementations of the second aspect.

According to a seventh aspect, this application provides a transmit power determining method, including: mapping, by a first device, data to a plurality of transport layers, where the plurality of transport layers include a first transport layer, the first transport layer is corresponding to a first RE set and a second RE set, the first RE set and the second RE set each include a plurality of REs, each RE in the first RE set is mapped to a phase tracking reference signal (PTRS), and each RE in the second RE set cannot be used for data mapping; increasing, by the first device by using power of all REs in the second RE set, transmit power of PTRSs mapped to all REs in the first RE set; and sending, by the first device, the PTRS by using increased transmit power.

According to an eighth aspect, an embodiment of this application provides a communications device, including: a processor, configured to: map data to a plurality of transport layers, where the plurality of transport layers include a first transport layer, the first transport layer is corresponding to a first RE set and a second RE set, the first RE set and the second RE set each include a plurality of REs, each RE in the first RE set is mapped to a phase tracking reference signal PTRS, and each RE in the second RE set cannot be used for data mapping; and increase, by using power of all REs in the second RE set, transmit power of PTRSs mapped to all REs in the first RE set; and a transmitter, configured to send the PTRS by using increased transmit power.

In the embodiments of this application, a transmit end device first obtains the relative power ratio of the PTRS to the data channel or to the DMRS by searching a table or through calculation, determines the transmit power of the PTRS based on the transmit power of the data channel or the transmit power of the DMRS, and sends the PTRS by using the transmit power, so that different quantities of DMRS ports, different quantities of PTRS ports, and different port multiplexing manner configurations can be flexibly adapted, thereby ensuring efficient energy use.

BRIEF DESCRIPTION OF DRAWINGS

To describe the technical solutions in the embodiments of the present disclosure clearly, the following briefly describes the accompanying drawings for describing the embodiments or the conventional art. Apparently, the accompanying drawings in the following description show merely some embodiments of the present disclosure, and a person of ordinary skill in the art may derive other drawings from these accompanying drawings without creative efforts.

FIG. 4B-1 and FIG. 4B-2 are schematic diagrams of pilot patterns according to an embodiment of this application (uplink transmission, two transport layers, two DMRS ports, and one PTRS port, where the two DMRS ports are grouped into one group);

FIG. 4C-1 and FIG. 4C-2 are schematic diagrams of pilot patterns according to an embodiment of this application (uplink transmission, two transport layers, two DMRS ports, and two PTRS ports, where the two DMRS ports are grouped into two groups);

DESCRIPTION OF EMBODIMENTS

The following further describes in detail this application with reference to accompanying drawings.

The embodiments of this application can be applied to various mobile communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), an evolved Long Term Evolution (eLTE) system, a 5G system (for example, a new radio (NR) system), and other mobile communications systems.

Some terms in this application are described below to facilitate understanding.

(1) A terminal is also referred to as user equipment (UE), and is a device that provides voice and/or data connectivity for a user, for example, a handheld device or an in-vehicle device with a wireless connection function. For example, a common terminal includes a mobile phone, a tablet computer, a notebook computer, a palmtop computer, a mobile Internet device (MID), and a wearable device such as a smart watch, a smart band, or a pedometer.

(2) A network device may be a base transceiver station (BTS) in a GSM system or a CDMA system, a NodeB (NB) in a WCDMA system, an evolved NodeB (eNB or eNodeB) in an LTE system, or a wireless controller in a cloud radio access network (CRAN). Alternatively, the network device may be a network device in a future 5G network, for example, a gNB, a small cell, a micro cell, or a transmission reception point (TRP) in an NR system, or may be any other wireless access device such as a relay station, an access point, or a network device in a future evolved public land mobile network (PLMN). However, the embodiments of this application are not limited thereto.

(3) The term "a plurality of" refers to two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, it should be understood that although the terms "first", "second", "third", and the like may be used in the embodiments of this application to describe various messages, requests, and terminals, these messages, requests, and terminals are not limited to these terms. These terms are merely used to distinguish between the messages, requests, and terminals.

Figure 1A:
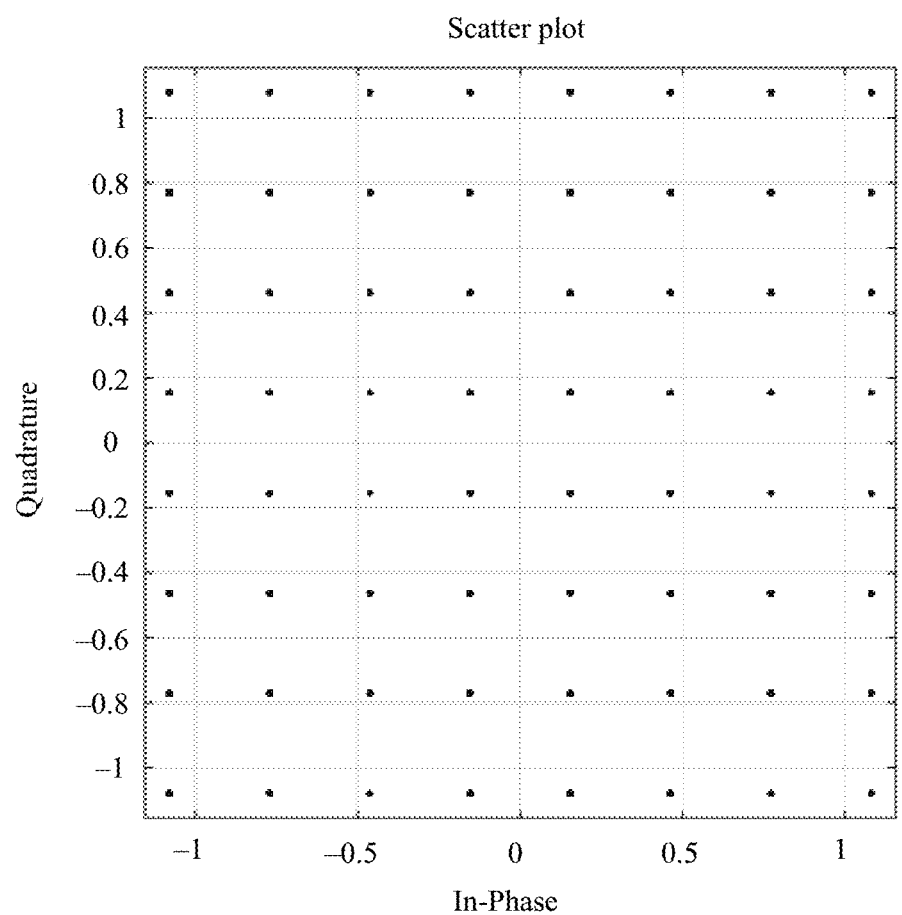
FIG. 1A shows a constellation point at which a 64QAM modulation signal is not affected by phase noise.
Figure 1B:
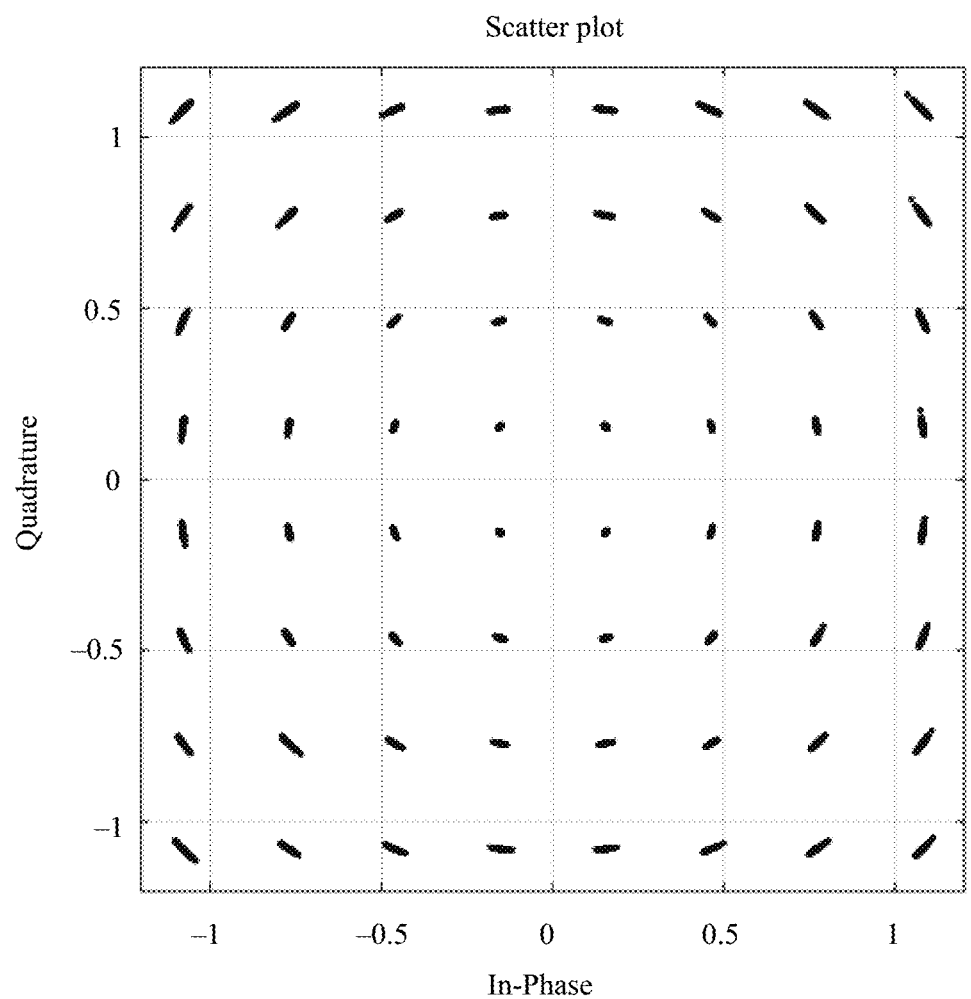
FIG. 1B shows a constellation point at which a 64QAM modulation signal on a 2G band is affected by phase noise.
Figure 1C:
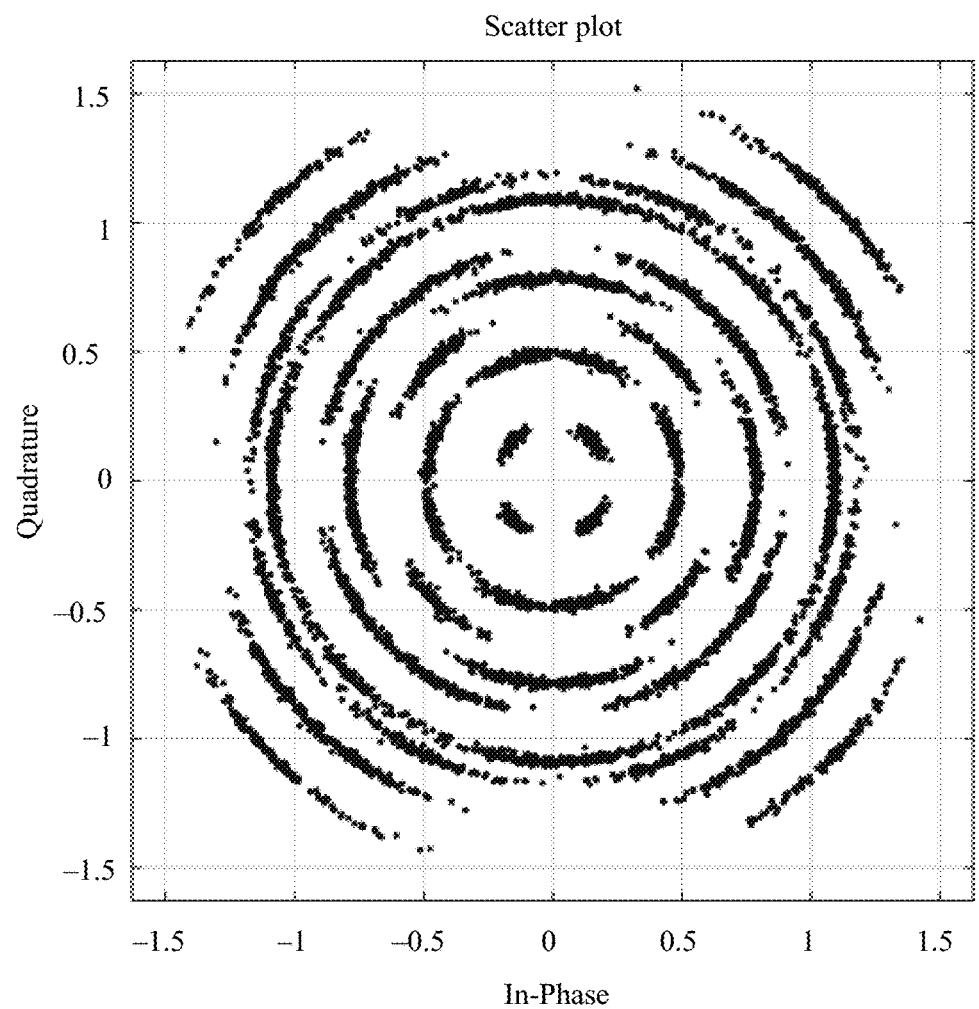
FIG. 1C shows a constellation point at which a 64QAM modulation signal on a 28G band is affected by phase noise.
Figure 2:
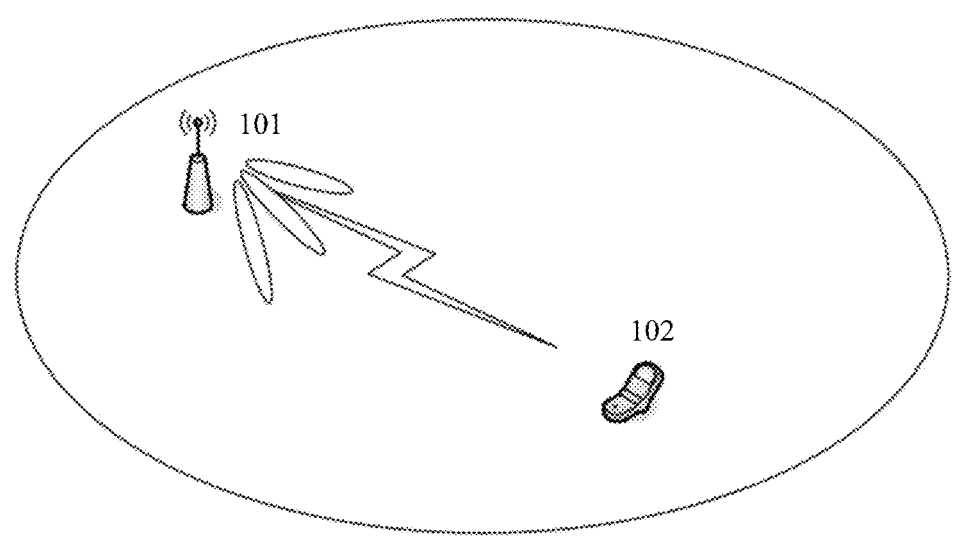
FIG. 2 is a schematic structural diagram of an application scenario according to an embodiment of this application.

FIG. 2 is a schematic structural diagram of an application scenario of the embodiments of this application. A networking architecture shown in FIG. 2 mainly includes a base station 101 and a terminal 102. The base station 101 may communicate with the terminal 102 by using a millimeter-wave band with a low frequency (mainly below 6 GHz) or a relatively high frequency (above 6 GHz). For example, the millimeter-wave band may be 28 GHz, 38 GHz, or an enhanced band of a data plane with a relatively small coverage area, for example, a band above 70 GHz. The terminal 102 covered by the base station 101 may communicate with the base station 101 by using a millimeter-wave band with a low frequency or a relatively high frequency. FIG. 2 is merely an example of a simplified schematic diagram, and a network may further include another device that is not shown in FIG. 2.

A communication method and a communications device provided in the embodiments of this application can be applied to a terminal, and the terminal includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more of computer operating systems that implement service processing by using a process, for example, a Linux operating system, a UNIX operating system, an Android operating system, an iOS operating system, or a Windows operating system. The application layer includes applications such as a browser, a contact list, word processing software, and instant messaging software.

In addition, aspects or features of this application may be implemented as a method, an apparatus, or a product that uses standard programming and/or engineering technologies. The term "product" used in this application covers a computer program that can be accessed from any computer readable component, carrier or medium. For example, a computer readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine readable media for storing information. The term "machine readable media" may include but is not limited to various media that can store, contain, and/or carry an instruction and/or data.

To better understand this application, the following describes this application with reference to the accompanying drawings.

Embodiment 1

Figure 3:
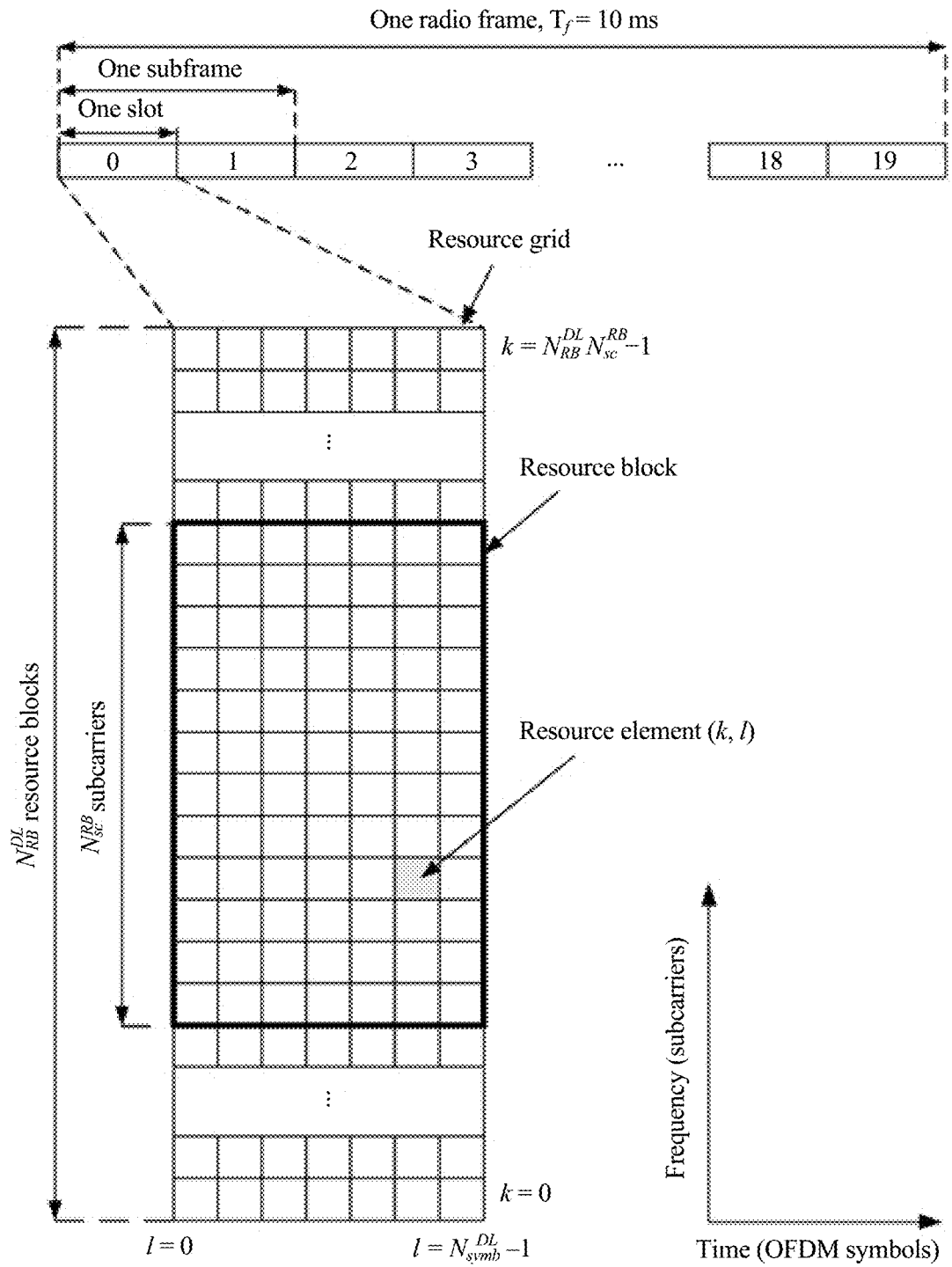
FIG. 3 is a diagram of a resource grid in an LTE system.

FIG. 3 is a diagram of a resource grid in an LTE system. As shown in the diagram, a channel is sent in a form of consecutive radio frames in the LTE system. One radio frame includes 10 subframes, a length of each subframe is 1 millisecond (ms), each subframe includes two timeslots (slot), and each slot is 0.5 ms. A quantity of symbols included in each slot is associated with a length of a cyclic prefix (CP) in a subframe. If the CP is a normal CP, each slot includes seven symbols, and each subframe includes 14 symbols. If the CP is an extended CP, each slot includes six symbols, and each subframe includes 12 symbols. A downlink symbol is referred to as an orthogonal frequency division multiplexing (OFDM) symbol. In the LTE system, a resource element (RE) is a minimum unit in time-frequency domain, and is uniquely identified by an index pair (k, l), where k is a subcarrier index, and l is a symbol index.

Compared with an existing wireless communications network, a next-generation wireless communications network that works in a range of above 6 GHz suffers more serious intermediate radio frequency distortion, especially impact of phase noise. A higher phase noise level causes greater common phase error (CPE) impact. Therefore, a phase tracking reference signal (PTRS) is introduced for phase noise estimation.

However, the PTRS occupies some REs, and the occupied RE is originally used to send a data channel or another reference signal. During uplink transmission, the data channel includes a physical uplink shared channel (PUSCH), and during downlink transmission, the data channel includes a physical downlink shared channel (PDSCH). A most common case is that the occupied RE is originally used to send the data channel. In this case, total power of the PTRS needs to be equal to total power of the data channel that is originally to be sent in the occupied RE ("power" in this embodiment of this application is equivalent to "transmit power"). Total available power of a transmit end is preconfigured. Therefore, if transmit power of the PTRS is greater than transmit power of the data channel that is originally to be sent in the occupied RE, the total available power is exceeded. If the transmit power of the PTRS is less than the transmit power of the data channel that is originally to be sent in the occupied RE, a power waste is caused. Certainly, it is feasible that the transmit power of the PTRS is only slightly less than the transmit power of the data channel that is originally to be sent in the occupied RE (a difference does not exceed a preset threshold).

In an example of uplink transmission, if the transmit power of the PTRS is equal to the transmit power of the data channel that is originally to be sent in the occupied RE, a formula (1) may be obtained:

$$N_{layers} \times N_{RE/layers} \times P_{PUSCH} = N_{PTRS\ ports} \times N_{RE/PTRS\ ports} \times P_{PTRS} \quad (1)$$

$N_{layers}$ is a quantity of transport layers, $N_{RE/layers}$ is a quality of REs at each transport layer that cannot be used because of the PTRS (in one resource block (RB) and one OFDM symbol), $P_{PUSCH}$ is power of a PUSCH at the transport layer (in one RE), $N_{PTRS\ ports}$ is a quantity of PTRS ports, $N_{RE/PTRS\ ports}$ is a quantity of REs occupied by each PTRS port (in one RB and one OFDM symbol, where it is assumed that the quantity of REs is 1 herein), and $P_{PTRS}$ is the power of the PTRS (in one RE).

A formula (2) may be further obtained according to the formula (1):

$$\frac{P_{PTRS}}{P_{PUSCH}} = \frac{N_{layers} \times N_{RE/layers}}{N_{PTRS\ ports} \times N_{RE/PTRS\ ports}} \quad (2)$$

Because $N_{RE/layers} = N_{PTRS\ ports} \times N_{RE/PTRS\ ports}$, a formula (3) may be further obtained:

$$\frac{P_{PTRS}}{P_{PUSCH}} = N_{layers} \quad (3)$$

A formula (4) may be further obtained according to the formula (3):

relative power ratio of the PTRS to the PUSCH=10 $\log_{10}(N_{layers})$ (4)

Because the quantity of transport layers is equal to a quantity of DMRS ports, a formula (5) may be further obtained:

relative power ratio of the PTRS to the PUSCH=10 $\log_{10}(N_{DMRS\ ports})$ (5)

A terminal device may obtain a relative power ratio of the PTRS to the PUSCH through calculation according to the formula (4) or (5), finally obtain the power of the PTRS based on the power of the PUSCH, and send the PTRS by using the power of the PTRS.

It can be learned, through calculation according to the formula (4) or (5), that when the quantity of transport layers is 1 to 8, the quantity of DMRS ports is 1 to 8, and the quantity of PTRS ports is equal to or less than the quantity of DMRS ports, the relative power ratio of the PTRS to the PUSCH is shown in Table (1):

TABLE (1)

| Quantity of transport layers | Quantity of DMRS ports | Relative power ratio (dB) of the PTRS to the PUSCH |
| --- | --- | --- |
| 1 | 1 | 0 |
| 2 | 2 | 3 |
| 3 | 3 | 4.77 |
| 4 | 4 | 6 |
| 5 | 5 | 7 |
| 6 | 6 | 7.78 |
| 7 | 7 | 8.45 |
| 8 | 8 | 9 |

When the quantity of transport layers is 1 to 12, the quantity of DMRS ports is 1 to 12, and the quantity of PTRS ports is equal to or less than the quantity of DMRS ports, Table (1) may be further extended, and the relative power ratio of the PTRS to the PUSCH is shown in Table (2):

TABLE (2)

| Quantity of transport layers | Quantity of DMRS ports | Relative power ratio (dB) of the PTRS to the PUSCH |
| --- | --- | --- |
| 1 | 1 | 0 |
| 2 | 2 | 3 |
| 3 | 3 | 4.77 |
| 4 | 4 | 6 |
| 5 | 5 | 7 |
| 6 | 6 | 7.78 |
| 7 | 7 | 8.45 |
| 8 | 8 | 9 |
| 9 | 9 | 9.54 |
| 10 | 10 | 10 |
| 11 | 11 | 10.41 |
| 12 | 12 | 10.79 |

To facilitate industrial practice, rounding down may be performed on the relative power ratio of the PTRS to the PUSCH in Table (1) and Table (2). For example, when the quantity of transport layers is 3 and the quantity of DMRS ports is 3, rounding down may be performed on the relative power ratio 4.77 of the PTRS to the PUSCH to obtain a value 4. Alternatively, only a one-digit decimal may be retained for the relative power ratio of the PTRS to the PUSCH in Table (1) and Table (2). For example, when the quantity of transport layers is 3 and the quantity of DMRS ports is 3, one-digit decimal may be retained for the relative power ratio 4.77 of the PTRS to the PUSCH to obtain a value 4.7. Whether rounding off is performed when rounding down is performed or a one-digit decimal is retained is not limited in this embodiment of this application.

The terminal device may further search a table (for example, Table (1) or Table (2)) to obtain the relative power ratio of the PTRS to the PUSCH, finally obtain the power of the PTRS based on the power of the PUSCH, and send the PTRS by using the power of the PTRS.

In addition, in the example of uplink transmission, when transmit power of a DMRS is equal to the transmit power of the data channel that is originally to be sent in the occupied RE, a formula (6) may be obtained:

$$N_{layers} \times N'_{RE/layers} \times P_{PUSCH} = N_{DMRS\ ports} \times N_{RE/DMRS\ ports} \times P_{DMRS} \quad (6)$$

$N_{layers}$ is a quantity of transport layers, $N_{DMRS\ ports}$ is a quantity of DMRS ports, $N'_{RE/layers}$ is a quantity of REs at each transport layer (in one RB and one OFDM symbol, where the quantity of REs is usually 12), $N_{RE/DMRS\ ports}$ is a quantity of REs occupied by each DMRS port (in one RB and one OFDM symbol), $P_{DMRS}$ is a power spectrum density (PSD) of the DMRS (in one RE), and $P_{PUSCH}$ is power of a PUSCH at the transport layer (in one RE).

A formula (7) may be further obtained according to the formula (6):

$$\frac{P_{DMRS}}{P_{PUSCH}} = \frac{N_{layers} \times N'_{RE/layers}}{N_{DMRS\ ports} \times N_{RE/DMRS\ ports}} \quad (7)$$

Because the quantity of transport layers is equal to the quantity of DMRS ports, a formula (8) may be obtained:

$$\frac{P_{DMRS}}{P_{PUSCH}} = \frac{N'_{RE/layers}}{N_{RE/DMRS\ ports}} \quad (8)$$

Because $D_{DMRS}$ is a frequency domain density of the DMRS, and is equal to $$\frac{N_{RE/DMRS\ ports}}{N'_{RE/layers}},$$

a formula (9) may be obtained:

$$\frac{P_{DMRS}}{P_{PUSCH}} = \frac{1}{D_{DMRS}} \quad (9)$$

A formula (10) may be further obtained according to the formula (9):

relative power ratio of the DMRS to the $$PUSCH = 10 \log_{10}\left(\frac{P_{DMRS}}{P_{PUSCH}}\right) \quad (10)$$

A formula (11) may be further obtained according to the formula (3) and the formula (9):

$$\frac{P_{PTRS}}{P_{DMRS}} = N_{layers} D_{DMRS} \quad (11)$$

A formula (12) may be further obtained according to the formula (11):

relative power ratio of the PTRS to the $$DMRS = 10 \log_{10}\left(\frac{P_{PTRS}}{P_{DMRS}}\right) \quad (12)$$

A formula (13) may be further obtained according to the formula (12):

relative power ratio of the PTRS to the DMRS=10 $\log_{10}(N_{DMRS\ ports} D_{DMRS})$ (13)

Because the quantity of transport layers is equal to the quantity of DMRS ports, a formula (14) may be further obtained:

relative power ratio of the PTRS to the DMRS=10 $\log_{10}(N_{DMRS\ ports} D_{DMRS})$ (14)

The terminal device may obtain a relative power ratio of the PTRS to the DMRS through calculation according to the formula (13) or (14), finally obtain the power of the PTRS based on the power of the DMRS, and send the PTRS by using the power of the PTRS.

It can be learned, through calculation according to the formula (13) or (14), that when the quantity of transport layers is 1 to 8, the quantity of DMRS ports is 1 to 8, and the quantity of PTRS ports is equal to or less than the quantity of DMRS ports, the relative power ratio of the PTRS to the DMRS is shown in Table (3):

TABLE (3)

| Quantity of transport layers | Quantity of DMRS ports | Frequency domain density of the DMRS | Relative power ratio (dB) of the PTRS to the DMRS |
|---|---|---|---|
| 1 | 1 | 1/4 | (−)6 |
| 2 | 2 | 1/4 | (−)3 |
| 3 | 3 | 1/4 | (−)1.23 |
| 4 | 4 | 1/4 | 0 |
| 5 | 5 | 1/4 | 0 |
| 6 | 6 | 1/4 | 0 |
| 7 | 7 | 1/4 | 0 |
| 8 | 8 | 1/4 | 3 |

When the quantity of transport layers is 1 to 12, the quantity of DMRS ports is 1 to 12, and the quantity of PTRS ports is equal to or less than the quantity of DMRS ports, Table (3) may be further extended, and the relative power ratio of the PTRS to the DMRS is shown in Table (4):

TABLE (4)

| Quantity of transport layers | Quantity of DMRS ports | Frequency domain density of the DMRS | Relative power ratio (dB) of the PTRS to the DMRS |
|---|---|---|---|
| 1 | 1 | 1/4 | (−)6 |
| 2 | 2 | 1/4 | (−)3 |
| 3 | 3 | 1/4 | (−)1.23 |
| 4 | 4 | 1/4 | 0 |
| 5 | 5 | 1/4 | 0 |

TABLE (4)-continued

| Quantity of transport layers | Quantity of DMRS ports | Frequency domain density of the DMRS | Relative power ratio (dB) of the PTRS to the DMRS |
|---|---|---|---|
| 6 | 6 | 1/4 | 0 |
| 7 | 7 | 1/4 | 0 |
| 8 | 8 | 1/4 | 3 |
| 9 | 9 | 1/6 | 1.76 |
| 10 | 10 | 1/6 | 2.22 |
| 11 | 11 | 1/6 | 2.63 |
| 12 | 12 | 1/6 | 3.01 |

The frequency domain density of the DMRS may be another value such as 1/2 or 1/3. Assuming that the frequency domain density of the DMRS may be 1/2, 1/3, 1/4, or 1/6 for each quantity of transport layers or each quantity of DMRS ports, Table (5) below may be obtained:

TABLE (5)

| Quantity of transport layers | Quantity of DMRS ports | Frequency domain density of the DMRS | Relative power ratio (dB) of the PTRS to the DMRS |
|---|---|---|---|
| 1 | 1 | 1/2 | −3 |
| 1 | 1 | 1/3 | −4.77 |
| 1 | 1 | 1/4 | −6 |
| 1 | 1 | 1/6 | −7.78 |
| 2 | 2 | 1/2 | 0.00 |
| 2 | 2 | 1/3 | −1.76 |
| 2 | 2 | 1/4 | −3 |
| 2 | 2 | 1/6 | −4.77 |
| 3 | 3 | 1/2 | 1.76 |
| 3 | 3 | 1/3 | 0.00 |
| 3 | 3 | 1/4 | −1.25 |
| 3 | 3 | 1/6 | −3 |
| 4 | 4 | 1/2 | 3 |
| 4 | 4 | 1/3 | 1.25 |
| 4 | 4 | 1/4 | 0.00 |
| 4 | 4 | 1/6 | −1.76 |
| 5 | 5 | 1/2 | 4 |
| 5 | 5 | 1/3 | 2.22 |
| 5 | 5 | 1/4 | 0.97 |
| 5 | 5 | 1/6 | −0.79 |
| 6 | 6 | 1/2 | 4.77 |
| 6 | 6 | 1/3 | 3 |
| 6 | 6 | 1/4 | 1.76 |
| 6 | 6 | 1/6 | 0.00 |
| 7 | 7 | 1/2 | 5.44 |
| 7 | 7 | 1/3 | 3.68 |
| 7 | 7 | 1/4 | 2.43 |
| 7 | 7 | 1/6 | 0.67 |
| 8 | 8 | 1/2 | 6 |
| 8 | 8 | 1/3 | 4.26 |
| 8 | 8 | 1/4 | 3 |
| 8 | 8 | 1/6 | 1.25 |
| 9 | 9 | 1/2 | 6.53 |
| 9 | 9 | 1/3 | 4.77 |
| 9 | 9 | 1/4 | 3.52 |
| 9 | 9 | 1/6 | 1.76 |
| 10 | 10 | 1/2 | 6.99 |
| 10 | 10 | 1/3 | 5.23 |
| 10 | 10 | 1/4 | 4 |
| 10 | 10 | 1/6 | 2.22 |
| 11 | 11 | 1/2 | 7.40 |
| 11 | 11 | 1/3 | 5.64 |
| 11 | 11 | 1/4 | 4.39 |
| 11 | 11 | 1/6 | 2.63 |
| 12 | 12 | 1/2 | 7.78 |
| 12 | 12 | 1/3 | 6 |
| 12 | 12 | 1/4 | 4.77 |
| 12 | 12 | 1/6 | 3 |

Table (5) provides many possibilities to configure the relative power ratio of the PTRS to the DMRS. This is not limited in this embodiment of this application.

In Table (3) to Table (5), because the quantity of transport layers is equal to the quantity of DMRS ports, only one of the first two columns may be retained. In addition, to facilitate industrial practice, rounding down may be performed on the relative power ratio of the PTRS to the DMRS in Table (3) to Table (5). For example, when the quantity of transport layers is 9 and the quantity of DMRS ports is 9, rounding down may be performed on the relative power ratio 1.76 of the PTRS to the DMRS to obtain a value 1. Alternatively, only a one-digit decimal may be retained for the relative power ratio of the PTRS to the DMRS in Table (3) to Table (5). For example, when the quantity of transport layers is 9 and the quantity of DMRS ports is 9, a one-digit decimal may be retained for the relative power ratio 1.76 of the PTRS to the DMRS to obtain a value 1.7. Whether rounding off is performed when rounding down is performed or a one-digit decimal is retained is not limited in this embodiment of this application.

The terminal device may search a table (for example, Table (3), Table (4), or Table (5)) to obtain the relative power ratio of the PTRS to the DMRS, finally obtain the power of the PTRS based on the power of the DMRS, and send the PTRS by using the power of the PTRS.

In a formula derivation process in this embodiment of this application, it is assumed that the quantity $N_{RE/PTRS\ ports}$ of REs occupied by each PTRS port (in one RB and one OFDM symbol) is 1. However, in implementation, the quantity of REs occupied by each PTRS port may alternatively be greater than 1 within one RB and one OFDM symbol, namely, $N_{RE/PTRS\ ports} > 1$. In this case, a frequency domain density of the PTRS needs to be added to the formula (4), the formula (5), the formula (13), and the formula (14) as another variable, as shown in a formula (15):

$$\text{relative power ratio of the PTRS to the PUSCH} = 10 \log_{10}(N_{layers} D_{PTRS})$$

$$\text{relative power ratio of the PTRS to the PUSCH} = 10 \log_{10}(N_{DMRS\ ports} D_{PTRS})$$

$$\text{relative power ratio of the PTRS to the DMRS} = 10 \log_{10}(N_{layers} D_{DMRS} D_{PTRS})$$

$$\text{relative power ratio of the PTRS to the DMRS} = 10 \log_{10}(N_{DMRS\ ports} D_{DMRS} D_{PTRS}) \quad (15)$$

$D_{PTRS}$ is the frequency domain density of the PTRS.

Correspondingly, the relative power ratio in Table (1) to Table (5) varies with the frequency domain density of the PTRS, but may be obtained through calculation according to the formula (15).

In this embodiment of this application, after obtaining the relative power ratio of the PTRS to the PUSCH through calculation according to the formal (4) or (5) or by searching Table (1) or Table (2), the terminal device may finally obtain the power of the PTRS based on the power of the PUSCH and another parameter $OFFSET_{PTRS-PUSCH}$, and send the PTRS by using the power of the PTRS. $OFFSET_{PTRS-PUSCH}$ represents a reference offset between the power of the PTRS and the power of the PUSCH, and may be configured by a base station. Similarly, after obtaining the relative power ratio of the PTRS to the DMRS through calculation according to the formal (13) or (14) or by searching Table (3), Table (4), or Table (5), the terminal device may finally obtain the power of the PTRS based on the power of the PUSCH and another parameter $OFFSET_{PTRS-DMRS}$, and send the PTRS by using the power of the PTRS. $OFFSET_{PTRS-DMRS}$ represents a reference offset between the power of the PTRS and the power of the DMRS, may be configured by the base station, and may be obtained by accumulating $OFFSET_{PTRS\text{-}PUSCH}$ and a reference offset $OFFSET_{DMRS\text{-}PUSCH}$ between the power of the DMRS and the power of the PUSCH.

In this embodiment of this application, the relative power ratio of the PTRS to the PUSCH and the relative power ratio of the PTRS to the DMRS may be preset or configured by the base station. After obtaining the relative power ratio of the PTRS to the PUSCH and the relative power ratio of the PTRS to the DMRS, the terminal device obtains the power of the PTRS by using the method described in this embodiment of this application.

In this embodiment of this application, the base station may further configure maximum power $P_{MAX}$ of the PTRS. When the power of the PTRS that is obtained by the terminal device through calculation according to any formula in this embodiment of this application is greater than $P_{MAX}$, the terminal device sends the PTRS by using $P_{MAX}$.

Next, in this embodiment of this application, the formula (4), the formula (5), the formula (13), and the formula (14), and Table (1) to Table (5) are verified by using an example. In the following example, DMRS ports are grouped based on different crystal oscillators, DMRS ports of a same local oscillator are grouped into one group, and phase noise of all ports in this group may be measured by using a PTRS on one port.

Figure 4A:
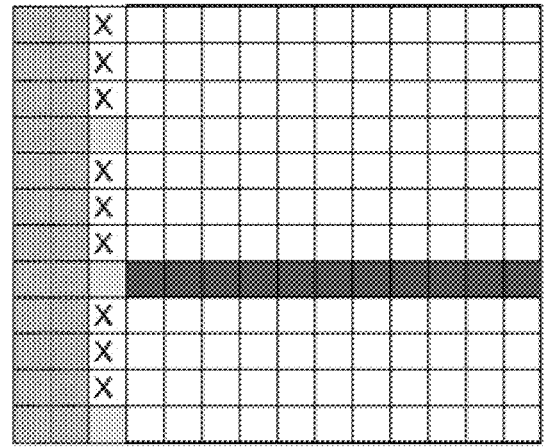
FIG. 4A is a schematic diagram of a pilot pattern according to an embodiment of this application (uplink transmission, one transport layer, one DMRS port, and one PTRS port)

FIG. 4A is a schematic diagram of a pilot pattern according to an embodiment of this application (uplink transmission, one transport layer, one DMRS port, and one PTRS port). It can be learned from FIG. 4A that in such a time-frequency resource mapping manner of the PTRS, the power of the PTRS and the power of the PUSCH are consistent, and the relative power ratio of the PTRS to the PUSCH is 0 dB.

Figures 1, 4B:
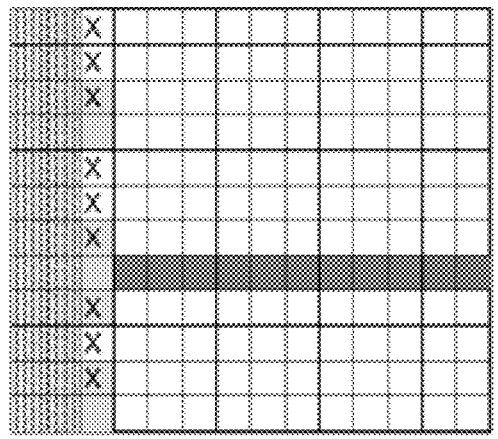
Figures 2, 4B:
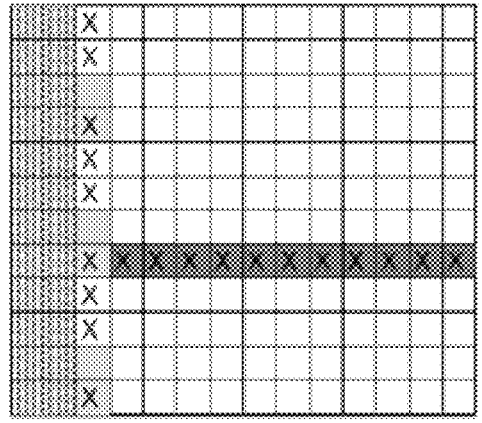

FIG. 4B-1 and FIG. 4B-2 are schematic diagrams of pilot patterns according to an embodiment of this application (uplink transmission, two transport layers, two DMRS ports, and one PTRS port, where the two DMRS ports are in one group). It can be learned from FIG. 4B-1 and FIG. 4B-2 that FIG. 4B-1 is a schematic diagram of a pilot pattern of a transport layer 1, and FIG. 4B-2 is a schematic diagram of a pilot pattern of a transport layer 2. Because two-layer transmission is performed, power of a PUSCH at each layer is only half of total power, and the PTRS is sent by only one port by using the total power. Therefore, the relative power ratio of the PTRS to the PUSCH is 3 dB.

Figures 1, 4C:
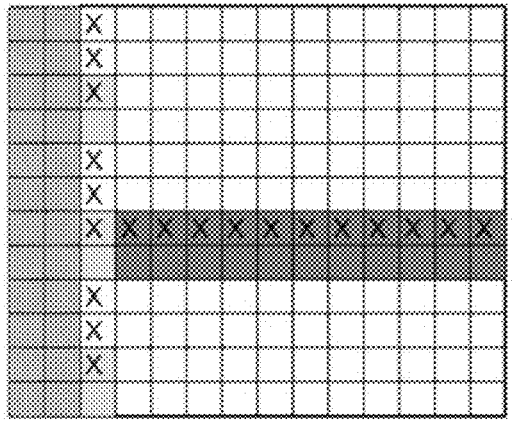
Figures 2, 4C:
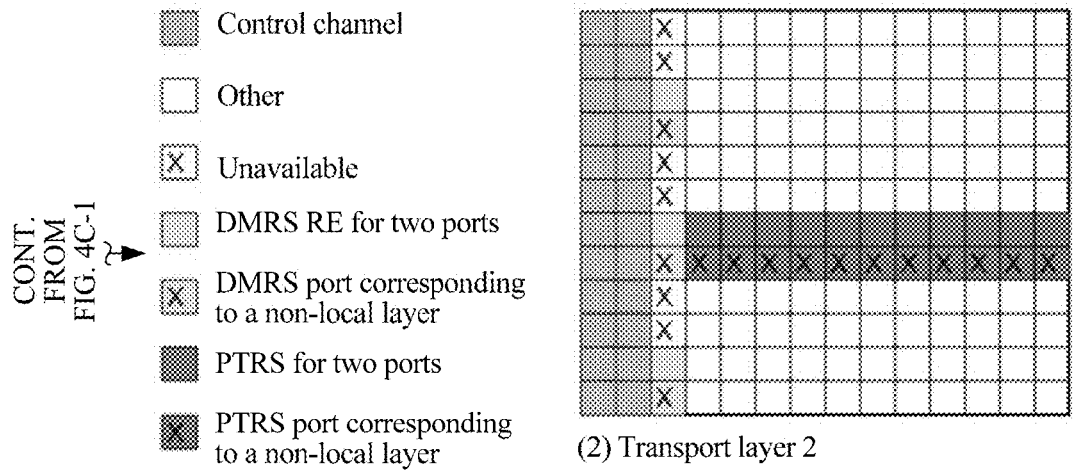

FIG. 4C-1 and FIG. 4C-2 are schematic diagrams of pilot patterns according to an embodiment of this application (uplink transmission, two transport layers, two DMRS ports, and two PTRS ports, where the two DMRS ports are in two groups). It can be learned from FIG. 4C-1 and FIG. 4C-2 that FIG. 4C-1 is a schematic diagram of a pilot pattern of a transport layer 1, and FIG. 4C-2 is a schematic diagram of a pilot pattern of a transport layer 2. Because of orthogonal hypothesis between the PTRS and data, an RE for sending the PTRS at the transport layer 1 cannot be mapped to data at the transport layer 2. Therefore, power of unavailable REs may be used to increase the transmit power of the PTRS. In other words, to keep total power consistent, power of a PTRS sent at each layer should be twice power of a data channel.

It can be learned that all the formulas and tables in this embodiment of this application are verified in FIG. 4A to FIG. 4C-2, and this is also true for other examples of the quantity of transport layers, the quantity of DMRS ports, and the quantity of PTRS ports. No enumeration is provided herein. "Other" in FIG. 4A to FIG. 4C-2 means that whether the RE is mapped to a data channel, another reference signal, or other signals is not limited. "Unavailable" means that the RE is unavailable or cannot be used for data mapping because of orthogonal multiplexing of a PTRS and a data channel.

Figure 5:
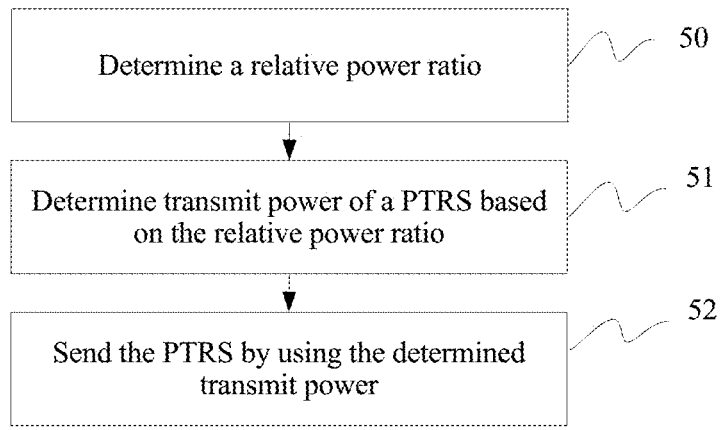
FIG. 5 is a schematic flowchart of a transmit power determining method according to an embodiment of this application.

FIG. 5 is a schematic flowchart of a transmit power determining method according to an embodiment of this application. As shown in FIG. 5, the method includes the following steps.

S50. A terminal device determines a relative power ratio of a PTRS to a PUSCH.

The terminal device may determine the relative power ratio of the PTRS to the PUSCH according to a formula provided in this embodiment of this application or by searching a table provided in this embodiment of this application, or the terminal device may further determine a relative power ratio of the PTRS to a DMRS.

S51. The terminal device determines transmit power of the PTRS.

The terminal device determines the transmit power of PTRS based on the relative power ratio of the PTRS to the PUSCH and transmit power of the PUSCH, or determines the transmit power of the PTRS based on the relative power ratio of the PTRS to the DMRS and transmit power of the DMRS.

S52. The terminal device sends the PTRS by using the determined transmit power.

Uplink transmission is used as an example for description in this embodiment of this application. For downlink transmission, because a new radio (NR) system uses an uplink-downlink symmetrical pilot pattern of the DMRS and an uplink-downlink symmetrical pilot pattern of the PTRS, all formulas and tables in this embodiment of this application are also applicable to downlink PTRS power determining, providing that the related "PUSCH" changes to a "PDSCH".

In this embodiment of this application, after a base station device obtains a pilot pattern, when a pilot pattern of a to-be-sent PTRS conflicts with a pilot pattern of another to-be-sent reference signal (i.e., a reference signal other than the PTRS), in other words, when the pilot pattern indicates that the to-be-sent PTRS and the another to-be-sent reference signal need to occupy a same RE or several same REs (a conflicting RE), the PTRS is not allowed to occupy an RE of the another reference signal (i.e., a priority of sending the another reference signal is higher than a priority of sending the PTRS). In this case, the base station device maps the another to-be-sent reference signal to the conflicting RE, and sends only the another reference signal on the conflicting RE. The transmit power of the PTRS may be determined by using the method described in the foregoing embodiment.

Alternatively, the to-be-sent PTRS is allowed to occupy an RE of the another to-be-sent reference signal. In this case, the base station device maps the to-be-sent PTRS to the conflicting RE, and sends only the PTRS on the conflicting RE. In addition, power of an RE originally used to send the another reference signal (excluding the conflicting RE mapped to the to-be-sent PTRS) may be used to increase the power of the PTRS.

In this embodiment of this application, the following expressions have a same meaning: an RE that cannot be used for data mapping, an RE that is not used for data mapping, an RE that is not mapped to data, and a muted RE. Generally, in this embodiment of this application, power of an RE that is not mapped to data is used to increase the power of the PTRS. A relative power ratio of the PTRS after the increment to data (which may also be referred to as "a difference between the power of the PTRS and power of the data) is equal to a logarithm of a quantity of transport layers (the quantity of transport layers is greater than or equal to 2 during multi-layer transmission), namely 10 log$_{10}$ (N$_{layers}$). When a quantity of PTRS ports is equal to a quantity of DMRS ports, to ensure orthogonal multiplexing of PTRSs and data at different transport layers of the terminal device, some REs at a specific transport layer are not mapped to data, and power of these REs that are not mapped to the data is used to increase power of a PTRS at the transport layer. In this case, a relative power ratio of a PTRS to data at each transport layer is equal to the logarithm of the quantity of transport layers. When the quantity of PTRS ports is less than the quantity of DMRS ports, power may be "borrowed" across layers. In other words, power of an RE at a specific transport layer that is not mapped to data is used to increase power of a PTRS at another transport layer, and a relative power ratio of transmit power of the PTRS to data at the transport layer of the PTRS is equal to the logarithm of the quantity of transport layers.

In this embodiment of this application, a transmit end device first obtains the relative power ratio of the PTRS to the data channel or to the DMRS by searching a table or through calculation, determines the transmit power of the PTRS based on the transmit power of the data channel or the transmit power of the DMRS, and sends the PTRS by using the transmit power, so that different quantities of DMRS ports, different quantities of PTRS ports, and different port multiplexing manner configurations can be flexibly adapted, thereby ensuring efficient energy use.

Figure 6:
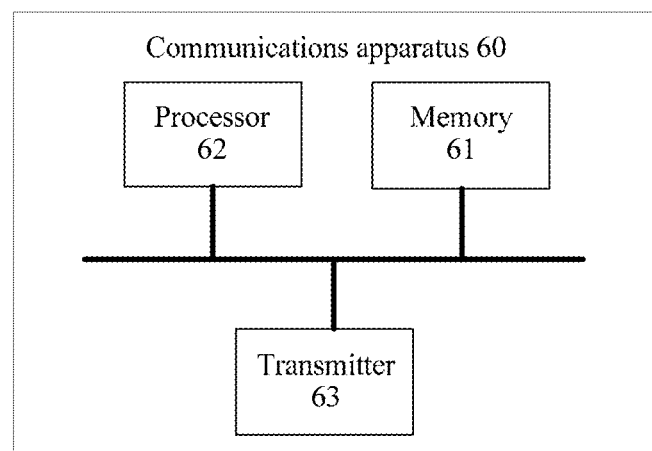
FIG. 6 is a schematic structural diagram of hardware of a communications device according to an embodiment of this application.

FIG. 6 is a schematic structural diagram of hardware of a communications device 60 according to an embodiment of this application. As shown in FIG. 6, the communications device 60 includes a memory 61, a processor 62, and a transmitter 63.

The memory 61 is configured to store program code including a computer operation instruction.

The processor 62 is configured to execute the computer operation instruction to perform the following operations:

determining a relative power ratio of a phase tracking reference signal (PTRS) to a data channel or a relative power ratio of a PTRS to a demodulation reference signal (DMRS). The relative power ratio of the PTRS to the data channel is determined by using a first function and a first variable, the relative power ratio of the PTRS to the DMRS is determined by using a second function, the first variable, and a second variable. The first variable includes a quantity of transport layers or a quantity of DMRS ports, and the second variable includes a frequency domain density of the DMRS; and determining transmit power of the PTRS based on the relative power ratio of the PTRS to the data channel and transmit power of the data channel or based on the relative power ratio of the PTRS to the DMRS and transmit power of the DMRS.

The transmitter 63 is configured to send the PTRS to another communications device by using the transmit power of the PTRS.

Optionally, the processor 62 is configured to execute the computer operation instruction to perform the following operations:

searching a table to determine a relative power ratio of a PTRS to a data channel or a relative power ratio of a PTRS to a d DMRS; and determining transmit power of the PTRS based on the relative power ratio of the PTRS to the data channel and transmit power of the data channel or based on the relative power ratio of the PTRS to the DMRS and transmit power of the DMRS.

Embodiment 2

Different from Embodiment 1 in which the transmit end first obtains the relative power ratio of the PTRS to the data channel or to the DMRS, and then determines the transmit power of the PTRS based on the transmit power of the data channel or the transmit power of the DMRS, in this embodiment of this application, the transmit power of the PTRS is directly obtained through calculation.

In an LTE system, uplink transmit power needs to meet a requirement of a signal to interference plus noise ratio (SINR) required when a bit error rate of data transmission on a PUSCH reaches 10% based on different modulation and coding schemes (MCS). A base station device determines transmit power of the PUSCH based on this requirement.

In an example of uplink transmission, a formula for calculating transmit power of a data channel may be:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \quad (16)$$

In the formula (16), i represents a subframe number (or a timeslot number or a symbol number), c represents a cell number (or a beam number or a beam group number), and j represents a preset value, and may be preset or configured by the base station device;

$P_{PUSCH,c}(i)$ represents transmit power used by a terminal device to send the PUSCH to a cell c in a subframe i;

$\hat{P}_{CMAX,c}(i)$ is a linear value of $P_{CMAX,c(i)}$, and $P_{CMAX,c}(i)$ represents available transmit power of the terminal device;

$\hat{P}_{PUCCH}(i)$ is a linear value of $P_{PUCCH}(i)$, and $P_{PUCCH}(i)$ represents transmit power used by the terminal device to send the PUCCH in the subframe i;

$M_{PUSCH,c}(i)$ represents bandwidth occupied by a PUSCH resource in the subframe i, and is expressed in a quantity of RBs;

$P_{O\_PUSCH,c}(i)$ represents reference power of the PUSCH, and $P_{O\_PUSCH,c}(j)=P_{O\_UE\_PUSCH,c}(j)+P_{O\_NOMINAL\_PUSCH,c}(j)$, where $P_{O\_NOMINAL\_PUSCH,c}(j)$ represents a semi-static transmit power reference in the cell c, and is usually a common value configured by the base station device for all terminal devices in the cell, and $P_{O\_UE\_PUSCH,c}(j)$ represents a power offset of a semi-static transmit power reference of each terminal device in the cell c, and is usually a specific value configured by the base station device for each terminal device;

$\alpha_c(j)$ represents a path loss compensation degree;

$PL_c$ represents a path loss value obtained after the terminal device measures a reference signal (for example, a channel state information-reference signal (CSI-RS), a cell-specific reference signal (CRS), or a synchronization signal block (SS Block for short)) of the cell c;

$\Delta_{TF,c}(i)$ represents that transmit power of each RB is allowed to be adaptive to an information data transmission rate according to a transmission format; and $f_c(i)$ represents closed-loop power control specific to the terminal device that may be classified into an accumulated value and an absolute value. A mode that is to be used is determined by using an accumulationEnable (whether TPC accumulation is used) parameter configured by the base station device. If the TPC accumulation is used, $f_c(i)=f_c(i-1)+\delta_{PUSCH,c}(i-K_{PUSCH})$ that is, $f_c(i)$ is a sum of an accumulated TPC value before an i$^{th}$ subframe and a TPC value $\delta_{PUSCH,c}$ indicated by downlink control information (DCI) received in an $(i-K_{PUSCH})^{th}$ subframe.

In this embodiment of this application, considering that the PTRS is used for phase tracking to assist data demodulation, when the transmit power of the PTRS is directly obtained through calculation, a transmit power determining method may be obtained based on some parameters in the formula (16). The method includes the following steps:

A terminal device obtains a preset adjustment parameter and transmission bandwidth of a PTRS.

The terminal device determines transmit power of the PTRS, where the transmit power of the PTRS is determined by using at least a preset function, an adjustment parameter, and the transmission bandwidth of the PTRS.

The terminal device sends the PTRS to a base station device by using the transmit power of the PTRS.

In this embodiment of this application, considering that the PTRS is used for phase tracking to assist data demodulation, when the transmit power of the PTRS is directly obtained through calculation, the transmit power of the PTRS may be determined based on some parameters in the formula (16) according to the following formula:

$$P_{PTRS,c}(i) = \min \begin{Bmatrix} P_{CMAX,c}(i) \\ P_{PTRS\_OFFSET,c}(m) + 10\log_{10}(M_{PTRS,c}) + \\ P_{O\_PUSCH,c}(j) + \alpha_c(j) \cdot PL_c + f_c(i) \end{Bmatrix} \quad (17)$$

In the formula (17), parameters $P_{CMAX,c}(i)$, $P_{O\_PUSCH,c}(j)$, $\alpha_c(j)$, $PL_c$, and $f_c(i)$ are all reused from the formula (16). In addition, $P_{PTRS,c}(i)$ represents the transmit power of the PTRS that includes transmit power used by the terminal device to send the PTRS to the cell c in the subframe i and whose value is in a unit of dBm, $M_{PTRS,c}$ represents the transmission bandwidth of the PTRS, $P_{PTRS\_OFFSET,c}(m)$ represents the present adjustment parameter, and m is equal to 0 or 1.

In this embodiment of this application, the base station device may configure or preset a parameter by using RRC signaling or DCI.

In this embodiment of this application, the transmit power of the PTRS is directly obtained through calculation, so that the terminal device can conveniently determine the transmit power of the PTRS.

Embodiment 3

This embodiment of this application provides another method for directly obtaining transmit power of a PTRS through calculation. The method includes the following steps:

A terminal device obtains reference power of a PTRS.

The terminal device determines transmit power of the PTRS, where the transmit power of the PTRS is determined by using at least a preset function and the reference power of the PTRS.

The terminal device sends the PTRS to a base station device by using the transmit power of the PTRS.

The terminal device may determine the transmit power of the PTRS according to the following formula:

$$P_{PTRS,c}(i) = \min \begin{Bmatrix} P_{CMAX,c}(i), \\ P_{O\_PTRS,c}(j) + \alpha_c(j) \cdot PL_c \end{Bmatrix} \quad (18)$$

In the formula (18), meanings of parameters $P_{PTRS,c}(i)$, $P_{CMAX,c}(i)$, $\alpha_c(j)$, and $PL_c$ are the same as those of the parameters in the formula (17). In addition, $P_{O\_PTRS,c}(j)$ represents the reference power of the PTRS, and $P_{O\_PTRS,c}(j) = P_{O\_NOMINAL\_PTRS} + P_{O\_UE\_PTRS}$, where $P_{O\_NOMINAL\_PTRS}$ represents a common value configured by the base station device for all terminal devices in a cell c, and $P_{O\_UE\_PTRS}$ represents a specific value configured by the base station device for each terminal device in the cell c.

Further, a parameter $g(i)$ may be further added to the formula (18), so that each terminal device can adjust the transmit power of the PTRS based on a condition of the terminal device, as shown in the following formula:

$$P_{PTRS,c}(i) = \min \begin{Bmatrix} P_{CMAX,c}(i), \\ P_{O\_PTRS,c}(j) + \alpha_c(j) \cdot PL_c + g(i) \end{Bmatrix}, \quad (19)$$

where $g(i)$ represents an adjustment parameter specific to the terminal device.

Further, parameters $h(n_{RS})$, $\Delta_{PTRS}(F)$, and $\Delta_{T \times D}(N_{PTRS\text{-}port})$ may be further added to the formula (18) to obtain the following formula:

$$P_{PTRS,c}(i) = \min \begin{Bmatrix} P_{CMAX,c}(i), \\ P_{O\_PTRS,c}(j) + \alpha_c(j) \cdot PL_c + h(n_{RS}) + \\ \Delta_{PTRS}(F) + \Delta_{T \times D}(N_{PTRS\text{-}port}) + g(i) \end{Bmatrix} \quad (20)$$

In the formula (20), $n_{RS}$ represents a priority parameter of the PTRS, and $h(n_{RS})$ represents a power offset obtained by the terminal device by using $n_{RS}$;

F represents a pilot pattern, $\Delta_{PTRS}(F)$ represents an adjustment value corresponding to the pilot pattern, and different pilot patterns are corresponding to different adjustment values; and $N_{PTRS\text{-}port}$ represents a quantity of antenna ports for sending the PTRS, $\Delta_{T \times D}(N_{PTRS\text{-}port})$ represents a power adjustment value corresponding to the quantity of antenna ports, and different quantities of antenna ports are corresponding to different adjustment values.

In this embodiment of this application, the transmit power of the PTRS is directly obtained through calculation, so that the terminal device can conveniently determine the transmit power of the PTRS.

The transmit power determining method provided in Embodiment 2 and Embodiment 3 may be performed by the communications device shown in FIG. 6. For example, the memory 61 is configured to store program code including a computer operation instruction. The processor 62 is configured to: obtain a required parameter, and obtain transmit power of a PTRS by using the parameter and the formulas (17) to (20). The transmitter 63 is configured to send the PTRS to another communications device by using the transmit power of the PTRS.

An embodiment of this application further provides a computer readable storage medium, configured to store a computer software instruction that needs to be executed by the foregoing processor. The computer software instruction includes a program that needs to be executed by the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method comprising:
    determining a power ratio between a phase tracking reference signal (PTRS) and a data channel according to a mapping relationship between a quantity of transport layers and the power ratio,
        wherein the power ratio is used for determining a transmit power of the PTRS; and
    wherein the mapping relationship comprises:
        the power ratio between the PTRS and the data channel is 3 dB when the quantity of transport layers is 2;
        the power ratio between the PTRS and the data channel is 4.77 dB when the quantity of transport layers is 3; and
        the power ratio between the PTRS and the data channel is 6 dB when the quantity of transport layers is 4,
        wherein a quantity of one or more PTRS ports for the PTRS is less than the quantity of transport layers.

2. The method according to claim 1, wherein the data channel is a physical uplink shared channel (PUSCH).

3. The method according to claim 1, wherein the mapping relationship further comprises:
    the power ratio between the PTRS and the data channel is 7 dB when the quantity of transport layers is 5; and
    the power ratio between the PTRS and the data channel is 7.78 dB when the quantity of transport layers is 6.

4. The method according to claim 3, wherein the data channel is a physical downlink shared channel (PDSCH).

5. The method according to claim 1, wherein the power ratio is a power ratio of a resource element (RE) level, the RE is a minimum unit in a time-frequency domain.

6. A method comprising:
    receiving a phase tracking reference signal (PTRS);
    receiving a data channel mapped to a plurality of transport layers; and
    wherein a power ratio between the PTRS and the data channel and a quantity of the plurality of transport layers meet a mapping relationship comprising:
        the power ratio between the PTRS and the data channel is 3 dB when the quantity of transport layers is 2;
        the power ratio between the PTRS and the data channel is 4.77 dB when the quantity of transport layers is 3; and
        the power ratio between the PTRS and the data channel is 6 dB when the quantity of transport layers is 4,
        wherein a quantity of one or more PTRS ports for the PTRS is less than the quantity of transport layers.

7. The method according to claim 6, wherein the data channel is a physical uplink shared channel (PUSCH).

8. The method according to claim 6, wherein the mapping relationship further comprises:
    the power ratio between the PTRS and the data channel is 7 dB when the quantity of transport layers is 5; and
    the power ratio between the PTRS and the data channel is 7.78 dB when the quantity of transport layers is 6.

9. The method according to claim 8, wherein the data channel is a physical downlink shared channel (PDSCH).

10. The method according to claim 6, wherein the power ratio is a power ratio of a resource element (RE) level, the RE is a minimum unit in a time-frequency domain.

11. An apparatus comprising:
    a processor configured to perform computer operation instructions of a memory, causing the apparatus to provide at least the following operations:
        determining a power ratio between a phase tracking reference signal (PTRS) and a data channel according to a mapping relationship between a quantity of transport layers and the power ratio,
            wherein the power ratio is used for determining a transmit power of the PTRS; and
        wherein the mapping relationship comprises:
            the power ratio between the PTRS and the data channel is 3 dB when the quantity of transport layers is 2;
            the power ratio between the PTRS and the data channel is 4.77 dB when the quantity of transport layers is 3; and
            the power ratio between the PTRS and the data channel is 6 dB when the quantity of transport layers is 4,
                wherein a quantity of one or more PTRS ports for the PTRS is less than the quantity of transport layers.

12. The apparatus according to claim 11, wherein the data channel is a physical uplink shared channel (PUSCH).

13. The apparatus according to claim 11, wherein the mapping relationship further comprises:
   the power ratio between the PTRS and the data channel is 7 dB when the quantity of transport layers is 5; and
   the power ratio between the PTRS and the data channel is 7.78 dB when the quantity of transport layers is 6.

14. The apparatus according to claim 13, wherein the data channel is a physical downlink shared channel (PDSCH).

15. The apparatus according to claim 11, wherein the power ratio is a power ratio of a resource element (RE) level, the RE is a minimum unit in a time-frequency domain.

16. An apparatus comprising:
   a processor configured to perform computer operation instructions of a memory, causing the apparatus to perform at least the following operations:
      receiving a phase tracking reference signal (PTRS);
      receiving a data channel mapped to a plurality of transport layers; and
      wherein a power ratio between the PTRS and the data channel and a quantity of the plurality of transport layers meet a mapping relationship comprising:
         the power ratio between the PTRS and the data channel is 3 dB when the quantity of transport layers is 2;
         the power ratio between the PTRS and the data channel is 4.77 dB when the quantity of transport layers is 3; and
         the power ratio between the PTRS and the data channel is 6 dB when the quantity of transport layers is 4,
            wherein a quantity of one or more PTRS ports for the PTRS is less than the quantity of transport layers.

17. The apparatus according to claim 16, wherein the data channel is a physical uplink shared channel (PUSCH).

18. The apparatus according to claim 16, wherein the mapping relationship further comprises:
   the power ratio between the PTRS and the data channel is 7 dB when the quantity of transport layers is 5; and
   the power ratio between the PTRS and the data channel is 7.78 dB when the quantity of transport layers is 6.

19. The apparatus according to claim 18, wherein the data channel is a physical downlink shared channel (PDSCH).

20. The apparatus according to claim 16, wherein the power ratio is a power ratio of a resource element (RE) level, the RE is a minimum unit in a time-frequency domain.

* * * * *